United States Patent
Levenson

(10) Patent No.: US 6,845,203 B1
(45) Date of Patent: *Jan. 18, 2005

(54) DETECTION OF ADSORBATES ON INTERIOR SURFACES OF HOLEY FIBERS

(76) Inventor: Marc David Levenson, 19868 Bonnie Ridge Way, Saratoga, CA (US) 95070

(*) Notice: Subject to any disclaimer, the term of this patent is extended or adjusted under 35 U.S.C. 154(b) by 0 days.

This patent is subject to a terminal disclaimer.

(21) Appl. No.: 10/730,721

(22) Filed: Dec. 8, 2003

Related U.S. Application Data

(63) Continuation-in-part of application No. 10/317,744, filed on Dec. 12, 2002, now Pat. No. 6,661,957, which is a continuation-in-part of application No. 09/907,241, filed on Jul. 17, 2001, now Pat. No. 6,496,634.

(51) Int. Cl.$^7$ ................................................ G02B 6/02
(52) U.S. Cl. ........................... 385/125; 385/12; 385/30; 422/82.11
(58) Field of Search .................... 385/125, 12, 30, 385/122–124; 359/342, 341.1; 422/82.11

(56) References Cited

U.S. PATENT DOCUMENTS 6,577,801 B2 * 6/2003 Broderick et al. ........... 385/125
6,661,957 B1 * 12/2003 Levenson et al. ........... 385/125

OTHER PUBLICATIONS

T.Monro et al., "Holey fibers for evanescent field devices", CLEO '99, CTuK70, p. 158(1999).*

* cited by examiner

Primary Examiner—Drew A. Dunn
Assistant Examiner—Leo Boutsikaris
(74) Attorney, Agent, or Firm—Rodney T. Hodgson

(57) ABSTRACT

The interior surfaces of the holes in holey optical fibers has adsorbed optically material which may be detected by propagating laser light down the axis of the fiber and detecting Raman, Infrared, or visible fluorescence or absorption.

19 Claims, 1 Drawing Sheet

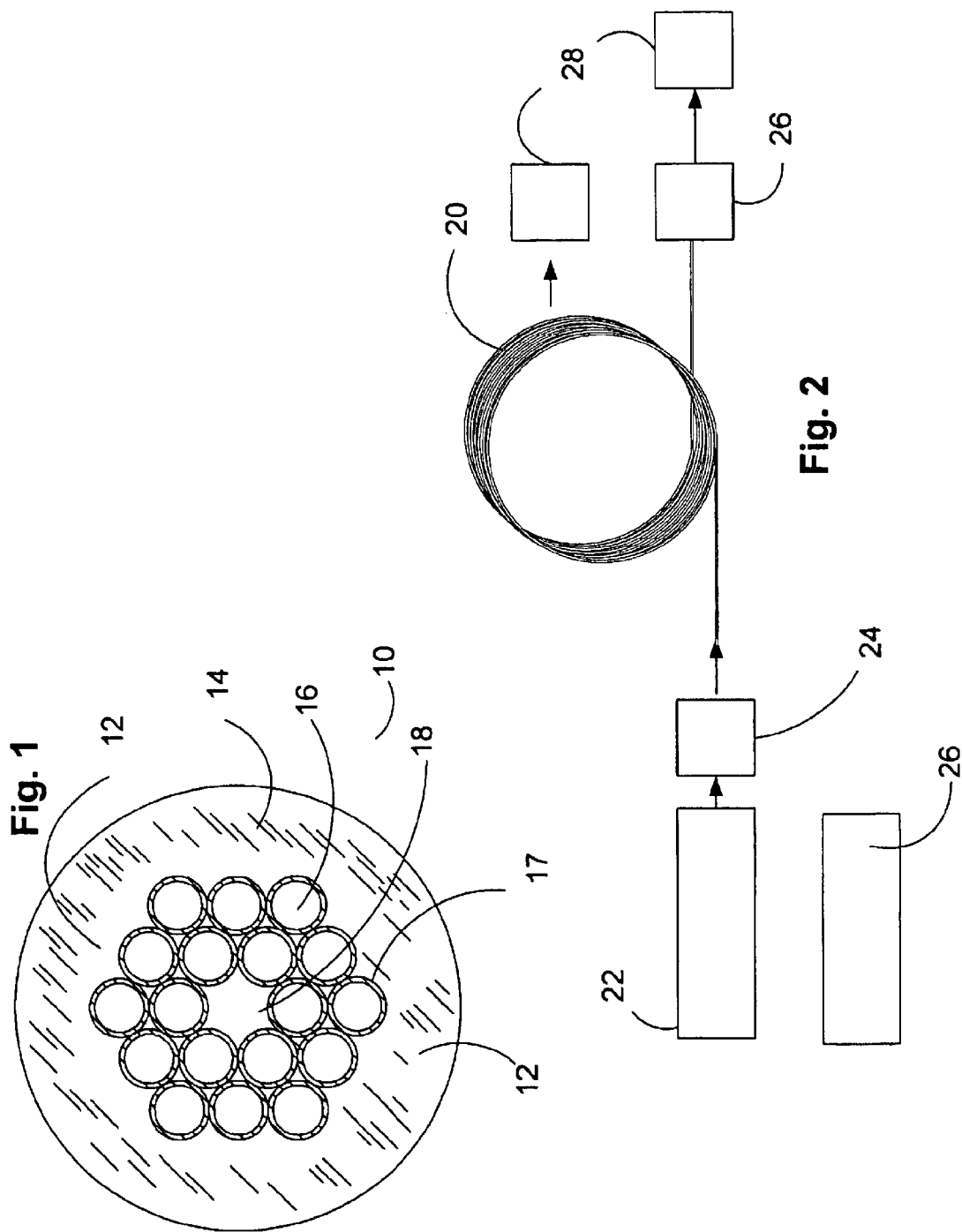

DETECTION OF ADSORBATES ON INTERIOR SURFACES OF HOLEY FIBERS

CROSS REFERENCE TO RELATED APPLICATIONS

This application is a continuation-in-part (CIP) of copending U.S. application Ser. No. 10/317,744 filed Dec. 12, 2002 (now U.S. Pat. No. 6,661,957 issued Dec. 09, 2003) which was a continuation-in-part (CIP) of copending U.S. application Ser. No. 09/907,241 filed Jul. 17, 2001 (now U.S. Pat. No. 6,496,634 issued Dec. 17, 2002), the above applications being incorporated herein by reference in their entirety including incorporated material.

FIELD OF THE INVENTION

The field of the invention is the field of optical fibers for the conduction of electromagnetic radiation, wherein the fibers have holes running along the fiber axis.

BRIEF DESCRIPTION OF THE DRAWINGS

FIG. 1 is a cross sectional view of a "holey" optical fiber of the invention.

FIG. 2 is a sketch of the system of the invention.

DETAILED DESCRIPTION OF THE INVENTION

Copending U.S. application Ser. No. 10/317,744 filed Dec. 12, 2002 (now U.S. Pat. No. 6,661,957 issued Dec. 09, 2003) and its parent application Ser. No. 09/907,241 filed Jul. 17, 2001 (now U.S. Pat. No. 6,496,634 issued Dec. 17, 2002), included a detailed description of an optical fiber having fluid filled holes for Raman amplification of light. FIG. 1 shows a sketch of a cross section of the optical fiber 10 of the invention. The fiber 10 comprises a core region 12 and a transparent cladding region 14 surrounding the core region. The core region contains a plurality of holes 16 elongated in the axial direction of the fiber. The core region may or may not contain a central hole region 18. The walls of at least one hole or the central region have an optically active material 17 adsorbed on to the wall.

Optical fibers will have a useful life measured in decades, and the material of the cladding 14 is usually fused silica.

When light is propagated down the fiber 10, it will propagate a great distance with high power. If the optically active material 17 is a Raman active material, Raman light will be generated and will also propagate down the axis of the fiber or may escape through the transparent walls of the fiber. The Raman light may be detected and thus the presence of the Raman active material may be detected.

Similarly, if the adsorbed material is an infrared, visible, or ultraviolet active material, light propagating down the optical fiber will be absorbed or scattered or fluoresced, and the presence of the material can be detected by detectors placed either at the output of the axis of the fiber or at the side of the fiber.

It is well known that molecules adsorbed on surfaces often have a much enhanced Raman cross section. Polar molecules such as air pollutants carbon monoxide, nitrogen oxide, and nitrogen dioxide are particularly preferred embodiments of the invention. Detection of biothreat materials such as bacteria and nerve gas material are also preferred embodiments of the invention. For purposes of investigation of relatively large entities like bacteria, the central hole region 18 may be much larger than the core region of a single mode optical fiber.

The method of the invention comprises introducing optically active molecules or other entities into the hollow core region 18 or into the holes 16 of the holey fiber, and propagating light down the axis of the core. The light will be guided by the holey fiber, and the intensity and interaction length will be much larger than if the light is merely focused in a gas or other fluid medium. It is well known that optically active molecules like carbon monoxide or nitrous oxide can be made to "stick" to either the clean walls of the holes or to specially prepared material of the walls.

FIG. 2 shows a sketch of the system of the invention. Light output from one or more lasers or other sources of light 22 is introduced into the fiber of the invention 20 by an optical apparatus 24 as is known in the art. Optical apparatus 26 is used to conduct light from the fiber 20 to detectors, spectral analysis units, signal splitters, demodulators, etc 28 as are known in the art. Control apparatus 26 controls the light generator 22 and optical apparatus 24 and communicates with detectors etc. 28.

Obviously, many modifications and variations of the present invention are possible in light of the above teachings. It is therefore to be understood that, within the scope of the appended claims, the invention may be practiced otherwise than as specifically described.

I claim:

1. A method, comprising:
    a) providing an apparatus, comprising an optical fiber having an axis, the optical fiber comprising a solid outer cladding region and a core region, the cladding region surrounding the core region, wherein the core region contains a plurality of holes elongated in the direction of the axis; then
    b) introducing an optically active material into at least one hole, wherein the optically active material is adsorbed on an interior surface of the hole; then
    c) propagating a laser beam into the optical fiber; then
    d) detecting the interaction of the laser beam with the material adsorbed on the interior surface of the hole.

2. The method of claim 1, wherein the optically active material is a Raman active material.

3. The method of claim 1, wherein the optically active material is a infrared active material.

4. The method of claim 1, wherein the optically active material is a biothreat material.

5. The method of claim 4, wherein the optically active material is a bacterium.

6. The method of claim 4, wherein the optically active material is a nerve gas molecule.

7. The method of claim 1, wherein the optically active material is a pollutant material.

8. The apparatus of claim 7, wherein the optically active material is carbon monoxide.

9. The method of claim 7, wherein the optically active material is a nitrogen oxide.

10. An apparatus, comprising;
    an optical fiber having an axis, the optical fiber comprising a solid outer cladding region and a core region, the cladding region surrounding the core region, wherein the core region contains a plurality of holes elongated in the direction of the axis, and wherein at least one hole contains optically active material adsorbed on the interior surface of the hole.

11. The apparatus of claim 10, wherein the optically active material is a Raman active material.

12. The apparatus of claim 10, wherein the optically active material is a infrared active material.

13. The apparatus of claim 10, wherein the optically active material is a biothreat material.

14. The apparatus of claim 13, wherein the optically active material is a bacterium.

15. The apparatus of claim 13, wherein the optically active material is a nerve gas molecule.

16. The apparatus of claim 10, wherein the optically active material is a pollutant material.

17. The apparatus of claim 16, wherein the optically active material is carbon monoxide.

18. The apparatus of claim 16, wherein the optically active material is a nitrogen oxide.

19. A system, comprising;
an optical fiber having an axis, the optical fiber comprising a solid outer cladding region and a core region, the cladding region surrounding the core region, wherein the core region contains a plurality of holes elongated in the direction of the axis, and wherein at least one hole contains optically active material adsorbed on the interior surface of the hole;
a laser apparatus for introducing laser pump light into the fiber;
optical apparatus for removing light from the fiber; and
control means for controlling the laser apparatus.

* * * * *